(12) United States Patent
Botti et al.

(10) Patent No.: US 9,023,952 B2
(45) Date of Patent: May 5, 2015

(54) METHOD OF PRODUCING A TREAD COMPOUND

(75) Inventors: Francesco Botti, Rome (IT); Davide Privitera, Anzio (IT)

(73) Assignee: Bridgestone Corporation, Tokyo (JP)

( * ) Notice: Subject to any disclaimer, the term of this patent is extended or adjusted under 35 U.S.C. 154(b) by 162 days.

(21) Appl. No.: 13/993,465

(22) PCT Filed: Dec. 23, 2011

(86) PCT No.: PCT/IB2011/055951
§ 371 (c)(1),
(2), (4) Date: Jul. 29, 2013

(87) PCT Pub. No.: WO2012/085893
PCT Pub. Date: Jun. 28, 2012

(65) Prior Publication Data
US 2013/0303706 A1 Nov. 14, 2013

(30) Foreign Application Priority Data
Dec. 23, 2010 (IT) .............................. TO2010A1055

(51) Int. Cl.
| | |
|---|---|
| C08C 19/25 | (2006.01) |
| C08F 36/06 | (2006.01) |
| C08C 19/20 | (2006.01) |
| C08F 36/02 | (2006.01) |
| C08F 8/34 | (2006.01) |
| B60C 1/00 | (2006.01) |
| C08K 3/36 | (2006.01) |
| C08K 5/548 | (2006.01) |

(52) U.S. Cl.
CPC ................. *C08F 36/06* (2013.01); *C08C 19/20* (2013.01); *C08F 36/02* (2013.01); *C08F 8/34* (2013.01); *B60C 1/0016* (2013.01); *C08C 19/25* (2013.01); *C08K 3/36* (2013.01); *C08K 5/548* (2013.01)

(58) Field of Classification Search
None
See application file for complete search history.

(56) References Cited

U.S. PATENT DOCUMENTS

| | | | |
|---|---|---|---|
| 2005/0209370 A1 | 9/2005 | Zhang et al. | |
| 2008/0149245 A1* | 6/2008 | Thielen et al. | 152/450 |
| 2008/0161458 A1* | 7/2008 | Fox et al. | 524/262 |
| 2010/0105805 A1 | 4/2010 | Sasaka | |
| 2010/0190885 A1* | 7/2010 | Hua et al. | 523/152 |

FOREIGN PATENT DOCUMENTS

| | | |
|---|---|---|
| EP | 1 788 020 A1 | 5/2007 |
| EP | 2 105 461 A1 | 9/2009 |
| WO | 2008/083242 A1 | 7/2008 |
| WO | 2008/083244 A1 | 7/2008 |
| WO | 2009/092811 A1 | 7/2009 |

* cited by examiner

*Primary Examiner* — Robert C Boyle
(74) *Attorney, Agent, or Firm* — Sughrue Mion, PLLC

(57) ABSTRACT

A method of producing a rubber compound, which includes mixing at least one cross-linkable unsaturated-chain polymer base, silica with a surface area of 100-220 m²/g, a first silane coupling agent in the polysulphide organosilane class, and a second silane coupling agent in the class of mercaptosilane protected in the form of thioester, and whereby the second silane coupling agent is added to the mix after the first silane coupling agent has reacted with the silica.

11 Claims, No Drawings

US 9,023,952 B2

1

METHOD OF PRODUCING A TREAD COMPOUND

CROSS REFERENCE TO RELATED APPLICATIONS

This application is a National Stage of International Application No. PCT/IB20011/055951, filed on Dec. 23, 2011, which claims priority from Italian Patent Application No. TO2010A001055, filed on Dec. 23, 2010, the contents of all of which are incorporated herein by reference in their entirety.

TECHNICAL FIELD

The present invention relates to a method of producing a tread compound.

BACKGROUND ART

As is known, part of the research carried out in the tyre industry is centred around improving tread wear resistance.

For this purpose, silica has long been used as a reinforcing filler in tread compounds, as a partial or total substitute for carbon black, because of the advantages it affords in terms of rolling resistance and wet road-holding performance.

Silica is used in combination with silane coupling agents, which bond with silanol groups to prevent the formation of hydrogen bonds between silica particles, and at the same time bond the silica chemically to the polymer base.

Using large-area silica in rubber compounds has been found to greatly improve the wear resistance of the compound.

Another ingredient found to improve the wear resistance of rubber compounds is a particular S-SBR polymer mix, which is characterized by containing 25-45% styrene and 20-70% vinyl, and by comprising 10-90% of a first fraction with a mean molecular weight of 50-100×10$^3$ and a molecular weight distribution of ≤1.5, and 10-90% of a second fraction with a mean molecular weight of 800-1500×10$^3$ and a molecular weight distribution of ≤3.0.

Both large-area silica and the above polymer mix, however, have the drawback of excessively increasing the viscosity of the mix, which obviously poses processing problems, not least of which are higher mixing power consumption and heating of the mix itself.

A need is therefore felt for a method of producing tread compounds, which enables the use of at least large-area silica, without impairing the workability of the mix.

The Applicant has surprisingly devised a method of producing tread compounds, designed to meet this demand.

DISCLOSURE OF INVENTION

According to the present invention, there is provided a method of producing a rubber compound, comprising mixing at least one cross-linkable unsaturated-chain polymer base, silica with a surface area of 100-220 m$^2$/g, a first silane coupling agent in the polysulphide organosilane class, and a second silane coupling agent in the class of mercaptosilane protected in the form of thioester; said method being characterized in that said second silane coupling agent is added to the mix after said first silane coupling agent has reacted with said silica.

Preferably, said method comprises a first mixing step of mixing at least said cross-linkable unsaturated-chain polymer base, 40-130 phr of said silica, and 2-15 phr of said first silane coupling agent; a second mixing step, in which 2-15 phr of

2 said second silane coupling agent are added to the mix from said first mixing step; and a final mixing step, in which curing agents are added.

Preferably, said cross-linkable unsaturated-chain polymer base comprises 20-60 phr of an S-SBR polymer mix containing 25-45% styrene and 20-70% vinyl, and comprising 20-40% of a first fraction with a mean molecular weight of 50-100×10$^3$ and a molecular weight distribution of ≤1.5, and 80-60% of a second fraction with a mean molecular weight of 800-1500×10$^3$ and a molecular weight distribution of ≤3.0.

Preferably, said cross-linkable unsaturated-chain polymer base also comprises 20-60 phr of E-SBR and/or S-SBR, and 0-20 phr of BR. S-SBR stands for styrene-butadiene rubber in solution, and E-SBR for styrene-butadiene rubber in emulsion.

Preferably, said first silane coupling agent has the structural formula (I):

$$(R^1O)_{3-p}(R^2)_p Si-R^3-S_a-R^3-Si(OR^1)_{3-r}(R^2)_r \qquad (I)$$

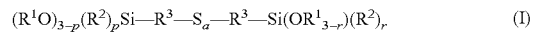

where:
each $R^1$, which may be the same as or different from others $R^1$, represents a linear, cyclic or branched alkyl group with 1 to 8 carbon atoms, or a linear or branched alkoxyalkyl group with 2 to 8 carbon atoms; each $R^2$, which may be the same as or different from others $R^2$, represents a linear, cyclic or branched alkyl group with 1 to 8 carbon atoms; each, which may be the same as or different from others $R^3$, represents a linear or branched alkylene group with 1 to 8 carbon atoms; a represents a number of 2 to 6; and p and r, which may be the same or different, each represent a number of 0 to 3, except when both p and r are 3.

Preferably, said first silane coupling agent is in the group comprising 3,3'-bis(triethoxysilylpropyl)disulphide, 3,3'-bis(triethoxysilylpropyl)tetrasulphide and mixes thereof.

Preferably, the second silane coupling agent has the structural formula (II):

$$R^4_x R^5_y R^6_z SiR^7 SCOR^8 \qquad (II)$$

where:
$R^4$ represents an atom or a monovalent group selected from —Cl, —Br, $R^9O$—, $R^9C(=O)O$—, $R^9R^{10}C=NO$—, $R^9R^{10}CNO$—, $R^9R^{10}N$— and —(OSi $R^9R^{10}$)$_h$(OSi $R^9R^{10}R^{11}$), where $R^9$, $R^{10}$ and $R^{11}$, which may be the same or different, each represent a hydrogen atom or a monovalent hydrocarbon group with 1 to 18 carbon atoms, and h represents a number of 1 to 4; $R^5$ is either the same as $R^4$, or a hydrogen atom or a monovalent hydrocarbon group with 1 to 18 carbon atoms; $R^6$ is either the same as $R^4$ and/or $R^5$, or a hydrogen atom or —[O(R$^{12}$O)$_j$]0.5, where $R^{12}$ represents an alkylene group with 1 to 18 carbon atoms, and j represents an integer of 1 to 4; $R^7$ represents a divalent hydrocarbon group with 1 to 18 carbon atoms; $R^8$ represents a monovalent hydrocarbon group with 1 to 18 carbon atoms; and x, y and z represent integers satisfying the relations x+y+2z=3, 0≤x≤3, 0≤y≤2 and 0≤z≤1.

Preferably, the second silane coupling agent has the structural formula:

$$(CH_3CH_2O)_3Si(CH_2)_3SCO(CH_2)_6CH_3$$

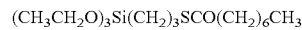

BEST MODE FOR CARRYING OUT THE INVENTION

The following are non-limiting examples for a clearer understanding of the present invention.

EXAMPLES

Four control compounds (A-D) and a compound (E) in accordance with the present invention were produced. More specifically, compound A is a standard tread compound of acknowledged satisfactory characteristics; compound B is a compound containing large-area silica; compound C is a compound containing both large-area silica and the S-SBR polymer mix; compound D is a compound in which the first and second silane coupling agents are added simultaneously to the mix; and compound E according to the invention is a compound in which the first silane coupling agent is added at a first mixing step, and the second silane coupling agent at a second mixing step.

Each compound was subsequently wear resistance and viscosity tested.

The example compounds described were produced as follows:

-First Mixing Step-

Before commencing the mixing operation, a 230-270-litre tangential-rotor mixer was loaded with the cross-linkable unsaturated-chain polymer base, the silica, the silane coupling agent, oil, carbon black, and stearic acid to a fill factor of 66-72%.

The mixer was operated at a speed of 40-60 rpm, and the resulting mix was unloaded on reaching a temperature of 140-160° C.

-Second Mixing Step-

The mix from the first step was mixed again in a mixer operated at 40-60 rpm, and was unloaded on reaching a temperature of 130-150° C. At this second mixing step, the second silane coupling agent was added to compound E.

-Third Mixing Step-

The curing system (sulphur, accelerants, antioxidants/antiozonants, zinc oxide) was added to the mix from the second step to a fill factor of 63-67%.

The mixer was operated at a speed of 20-40 rpm, and the resulting mix was unloaded on reaching a temperature of 100-110° C.

Table I shows the compositions in phr of the five compounds.

TABLE I

|  | A | B | C | D | E |
|---|---|---|---|---|---|
| E-SBR | 40 | 40 | 30 | 30 | 30 |
| S-SBR | 60 | 60 | 40 | 40 | 40 |
| LMW S-SBR | — | — | 30 | 30 | 30 |
| SILICA1 | 80 | — | — | — | — |
| SILICA2 | — | 80 | 80 | 80 | 80 |
| SILANE1 | 8 | 8 | 8 | 8 | 8 |
| SILANE2 | — | — | — | 8* | 8** |
| Carbon black | 10 | 10 | 10 | 10 | 10 |
| Oil | 30 | 30 | 30 | 30 | 30 |
| Stearic acid | 1 | 1 | 1 | 1 | 1 |
| Sulphur | 1.5 | 1.5 | 1.5 | 1.5 | 1.5 |
| Accelerants | 3.5 | 3.5 | 3.5 | 3.5 | 3.5 |
| Antioxidants/antiozonants | 3.5 | 3.5 | 3.5 | 3.5 | 3.5 |
| Zinc oxide | 2.5 | 2.5 | 2.5 | 2.5 | 2.5 |

*indicates the 8 phr of SILANE2 were added simultaneously with SILANE1 at the first mixing step.
**indicates the 8 phr of SILANE2 were added at the second mixing step.
LMW S-SBR is a rubber containing 25-45% styrene and 20-70% vinyl, and comprising:
— 20-40% of a first fraction with a mean molecular weight of 50-100 × $10^3$ and a molecular weight distribution of ≤1.5; and
— 80-60% of a second fraction with a mean molecular weight of 800-1500 × $10^3$ and a molecular weight distribution of ≤3.0.
SILICA1 is a commercial product marketed by Evonik as VN3.
SILICA2 is a commercial product marketed by RHODIA as MP200, and has a surface area of 210 $m^2$/g and 55 nm particle size.
SILANE1 is a commercial silane coupling agent marketed by DEGUSSA as S175.
SILANE2 is of structural formula:
$(CH_3CH_2O)_3Si(CH_2)_3SCO(CH_2)_6CH_3$
The accelerants used are a mixture of MBTS, TBBS and DPG, and are the same for all the compounds.
The antioxidants/antiozonants used are the same for all the compounds.

As stated, compounds A-E were wear resistance and viscosity tested, and the results indexed with respect to compound A.

More specifically, abrasion resistance was tested as per DIN Standard 53 516, and viscosity measured as per ASTM Standard D1646.

Table II shows the test results indexed with respect to compound A.

TABLE II

|  | A | B | C | D | E |
|---|---|---|---|---|---|
| Abrasion resistance | 100 | 110 | 120 | 100 | 120 |
| Viscosity | 100 | 110 | 120 | 100 | 100 |

As shown in Table II, the compound (E) produced using the method according to the invention is the only one that shows an improvement in abrasion resistance with no increase in viscosity.

The method of producing compound E by adding the two silane coupling agents in two different mixing steps represents a preferred embodiment of the invention, but does not exclude the possibility of the two silane coupling agents being added at different times in the same mixing step.

The invention claimed is:

1. A method of producing a rubber compound, comprising mixing at least one cross-linkable unsaturated-chain polymer base, silica with a surface area of 100-220 $m^2$/g, a first silane coupling agent in the polysulphide organosilane class, and a second silane coupling agent in the class of mercaptosilane protected in the form of thioester; said method being characterized in that said second silane coupling agent is added to the mix after said first silane coupling agent has reacted with said silica.

2. A method of producing a rubber compound, as claimed in claim 1, characterized in that mixing comprises a first mixing step of mixing at least said cross-linkable unsaturated-chain polymer base, 40-130 phr of said silica, and 2-15 phr of said first silane coupling agent; a second mixing step, in which 2-15 phr of said second silane coupling agent are added to the mix from said first mixing step; and a final mixing step, in which curing agents are added.

3. A method of producing a rubber compound, as claimed in claim 1, characterized in that said cross-linkable unsaturated-chain polymer base comprises 20-60 phr of an S-SBR polymer mix containing 25-45% styrene and 20-70% vinyl, and comprising 20-40% of a first fraction with a mean molecular weight of 50-100×$10^3$ and a molecular weight distribution of ≤1.5, and 80-60% of a second fraction with a mean molecular weight of 800-1500×$10^3$ and a molecular weight distribution of ≤3.0.

4. A method of producing a rubber compound, as claimed in claim 3, characterized in that said cross-linkable unsaturated-chain polymer base comprises 20-60 phr of E-SBR and/or S-SBR, and 0-20 phr of BR.

5. A method of producing a rubber compound, as claimed in claim 1, characterized in that said first silane coupling agent has the structural formula (I):

$$(R^1O)_{3-p}(R^2)_pSi-R^3-S_a-R^3-Si(OR^1_{3-r})(R^2)_r \quad (I)$$

where:
each $R^1$, which may be the same as or different from others $R^1$, represents a linear, cyclic or branched alkyl group with 1 to 8 carbon atoms, or a linear or branched alkoxyalkyl group with 2 to 8 carbon atoms; each $R^2$, which may be the same as or different from, represents a linear, cyclic or branched alkyl group with 1 to 8 carbon atoms; each $R^3$, which may be the same as or different from, represents a linear or branched alkylene group with 1 to 8 carbon atoms; a represents a number of 2 to 6; and p and r, which may be the same or different, each represent a number of 0 to 3, except when both p and r are 3.

6. A method of producing a rubber compound, as claimed in claim 5, characterized in that said first silane coupling agent is in the group comprising 3,3'-bis(triethoxysilylpropyl)disulphide, 3,3'-bis(triethoxysilylpropyl)tetrasulphide and mixes thereof.

7. A method of producing a rubber compound, as claimed in claims 1, characterized in that said second silane coupling agent has the structural formula (II):

$$R^4{}_xR^5{}_yR^6{}_zSiR^7SCOR^8 \qquad (II)$$

where:

$R^4$ represents an atom or a monovalent group selected from —Cl, —Br, $R^9O$—, $R^9C(=O)O$—, $R^9R^{10}C=NO$—, $R^9R^{10}CNO$—$R^9R^{10}N$—and -$(OSi\ R^9R^{10})_h(OSi\ R^9R^{10}R^{11})$, where $R^9$, $R^{10}$ and $R^{11}$, which may be the same or different, each represent a hydrogen atom or a monovalent hydrocarbon group with 1 to 18 carbon atoms, and h represents a number of 1 to 4; is either the same as $R^4$, or a hydrogen atom or a monovalent hydrocarbon group with 1 to 18 carbon atoms; $R^6$ is either the same as $R^4$ and/or $R^5$, or a hydrogen atom or -$[O(R^{12}O)_j]0.5$, where $R^{12}$ represents an alkylene group with 1 to 18 carbon atoms, and j represents an integer of 1 to 4; $R^7$ represents a divalent hydrocarbon group with 1 to 18 carbon atoms; $R^8$ represents a monovalent hydrocarbon group with 1 to 18 carbon atoms; and x, y and z represent integers satisfying the relations x+y+2z=3, 0≤x≤3, 0≤y≤2 and 0≤z≤1.

8. A method of producing a rubber compound, as claimed in claim 7, characterized in that said second silane coupling agent has the structural formula :

$$(CH_3CH_2O)_3Si(CH_2)_3SCO(CH_2)_6CH_3.$$

9. A tread compound, characterized by being produced using the method as claimed in claim 1.

10. A tread produced from a compound as claimed in claim 9.

11. A tyre comprising a tread as claimed in claim 10.

* * * * *